United States Patent

[11] 3,623,000

[72] Inventors Raymond C. Franke
Glenshaw;
George W. Donaldson, McKeesport, both of Pa.
[21] Appl. No. 32,228
[22] Filed Apr. 27, 1970
[45] Patented Nov. 23, 1971
[73] Assignee Westinghouse Air Brake Company
Swissvale, Pa.

[54] TRAINLINE CONTROL SYSTEM
10 Claims, 2 Drawing Figs.
[52] U.S. Cl. .................................................. 340/172,
105/61, 317/140, 340/167 R
[51] Int. Cl. ...................................................... B60l 15/32
[50] Field of Search .......................................... 340/172,
167, 206; 325/38, 64; 307/271; 318/91, 101, 103;
317/140, 139, 137; 105/61

[56] References Cited
UNITED STATES PATENTS
1,750,161 3/1930 Deans et al. .................. 318/91 X 3,170,090 2/1965 Schlatter et al. ............... 317/140 X
2,552,013 5/1951 Orpin ........................... 340/172 X

*Primary Examiner*—Arthur L. La Point
*Assistant Examiner*—George H. Libman
*Attorneys*—H. A. Williamson, A. G. Williamson, Jr. and J. B. Sotak ABSTRACT: One winding of a differential relay on each car is connected through successively increasing resistors to a constant voltage trainline thus supplying a successively decreasing constant current to each relay. The other winding of each relay is connected to another trainline through which pulses of variable duration are transmitted. By increasing the pulse duration, the controller increases the number of relays which are successively energized as the sum of pulse current plus constant current exceeds each relay pickup valve. Means for operating the system from either end of the train are also provided.

PATENTED NOV 23 1971     3,623,000

INVENTORS
Raymond C. Frankie and
BY   George W. Donaldson.

TRAINLINE CONTROL SYSTEM

Our invention relates to a trainline control system. More specifically, this invention relates to an arrangement for transmitting a plurality of control functions over a pair of trainline communication channels between an operator's position and the several cars of a train to selectively actuate corresponding controllable functions on the cars.

In the prior art arrangements for transmitting function controls between cars of a multiple unit train, such as used in a rapid transit system, direct current energy is applied at one end of a physical trainline wire extending throughout the train length to cause some action at the other end of the wire or even at several locations, one on each car of the train. These resulting actions may be the control or movement of a controllable function on that train. In these former systems, therefore, the control exercised was either on or off only. For example, one typical controllable function comprises the propulsion motor or motors which were placed in the same operating condition on all cars of the train. Another typical controllable function is the train braking which could either be turned on or off at some selected level simultaneously on each car of the train. In other words, such control functions were transmitted from the operator's location simultaneously to similar apparatus on each of the several cars. Although such trainlines are normally multiwire cables, many of the wires must be assigned for transmitting indications or control pertaining to the operation of car doors, the positioning of train signs, the turning on or off of car lights, and the transmission of indications or measurements of braking air pressure available. The more modern and sophisticated propulsion and braking control concepts which have been developed to provide a smoother and more comfortable ride, as well as more efficient operation, require additional control functions. It is impracticable or at least quite expensive to provide additional trainline wires. At the same time, it is not possible to eliminate any of the direct on or off control functions for other items of equipment as above enumerated, that is, train doors and train signs. Therefore, a need exists for some arrangement which will provide additional communication channels over an existing trainline cable so that a sufficient number of control functions may be transmitted to properly control the newer and more sophisticated propulsion and braking systems.

Accordingly, an object of this invention is an improved trainline control system.

Another object of our invention is an arrangement for transmitting a plurality of control functions over a lesser number of trainline communication channels.

Still another object is a control function transmission arrangement for individually controlling functions on several cars of a train over two channels in the trainline cable.

A further object of the invention is a system for controlling a plurality of different functions over one channel by a signal with a distinct duty cycle characteristic for each different function transmitted.

It is also an object of this invention to provide an arrangement using two channels in a trainline cable for transmitting a plurality of control functions, one to each car of a train.

A still further object of our invention is a system for transmitting control functions successively to cars of a multicar train in which signals with selected and successive duty cycle characteristics are transmitted over one channel in the trainline cable and balanced against a fixed signal transmitted over another channel to selectively operate differential relays on each car to actuate the corresponding control functions on each car of the train.

Other objects, features, and advantages of this invention will become apparent from the following specification when taken in connection with the appended claims and accompanying drawings.

In practicing our invention, each car of a multiple unit train, specifically shown as a four-car train, is provided with a differential-type relay. The specific controllable function on each car involved in the arrangement is controlled over a contact of the associated differential relay. One winding of each relay is connected to each of the directional wires in the trainline cable. These are the specific wires in the trainline cable on each car which, when the several cars are coupled together, are connected to the corresponding wires on the adjacent cars, forming a continuous channel or circuit path, with return through the common ground terminal, from one end of the train to the other. One or the other of the two directional circuit lines is energized in accordance with the established direction of travel for the train. This is an "on" or "off" energization condition and no intermediate level selection is provided. The connection for the relay winding to each directional trainline channel is through a separate, variable resistor. On the successive cars for any one direction of travel, the resistance is set successively higher from the lead to rear end of the train for each car's relay winding. Thus, when energy is applied to that directional trainline wire, the relays have successively less current flowing through this particular winding and correspondingly less operating flux is developed therein. Similar but opposite resistance settings are provided for the other directional line wire connections. Such energization of the one relay winding is insufficient, that it, develops insufficient flux, to cause the relay to pick up without any additional energization in the other winding of such relays.

The arrangement of our invention also provides a signal transmitter at the operator's control location or station or at the lead end of the train. This signal transmitter is connected to another trainline wire to which the other winding of each relay is connected, this trainline wire being coupled between the adjacent cars to form a continuous circuit path. Again, the communication channel for these signals is completed through the common ground connection for the train. This transmitter is basically an asymmetrical, astable multivibrator unit which transmits a series of pulses over the trainline channel. A control lever or switch is provided by which the operator may selectively control the on-time of the transmitted pulses. This on-time is also defined herein as percent duty cycle characteristic of the pulses. In other words, this selective switch controls the operating mode for the train by selectively actuating the controllable function on each car. The transmitted pulses flow through the other winding of each relay which functions as an averaging device to create an energization and resulting flux in accordance with the average or effective energy level of the transmitted signal pulses. These signal pulses alone do not provide sufficient energization of any relay winding to create a flux level to pick up that relay. With the first winding energized, however, sufficient flux is developed, as the pulse on-time is increased, that the relays selectively pick up in succession from the leading end of the train. In other words, when the signal with the lowest percent duty cycle is transmitted, the relay on only the first car of the train will pick up to actuate the controllable function, for example, a propulsion controller unit. As the percent duty cycle is selectively increased by the train operator, other car relays successively pick up as they receive sufficient energization to create a proper amount of flux, i.e., in accordance with the total flux created by the energization of both windings. Thus, the controllable functions are actuated on several cars of the train in sequential order. This arrangement and operation provide for different operating modes through the successive control, for example, of the propulsion motors on the different cars of the train.

We will now describe in more specific detail the arrangement embodying our invention with reference to the accompanying drawings in which.

Wherever applicable, similar reference characters refer to similar parts of the apparatus in each of the drawing figures. It is also assumed in the drawings that a source of direct current energy is available for controlling the illustrated apparatus.

Figure 1:
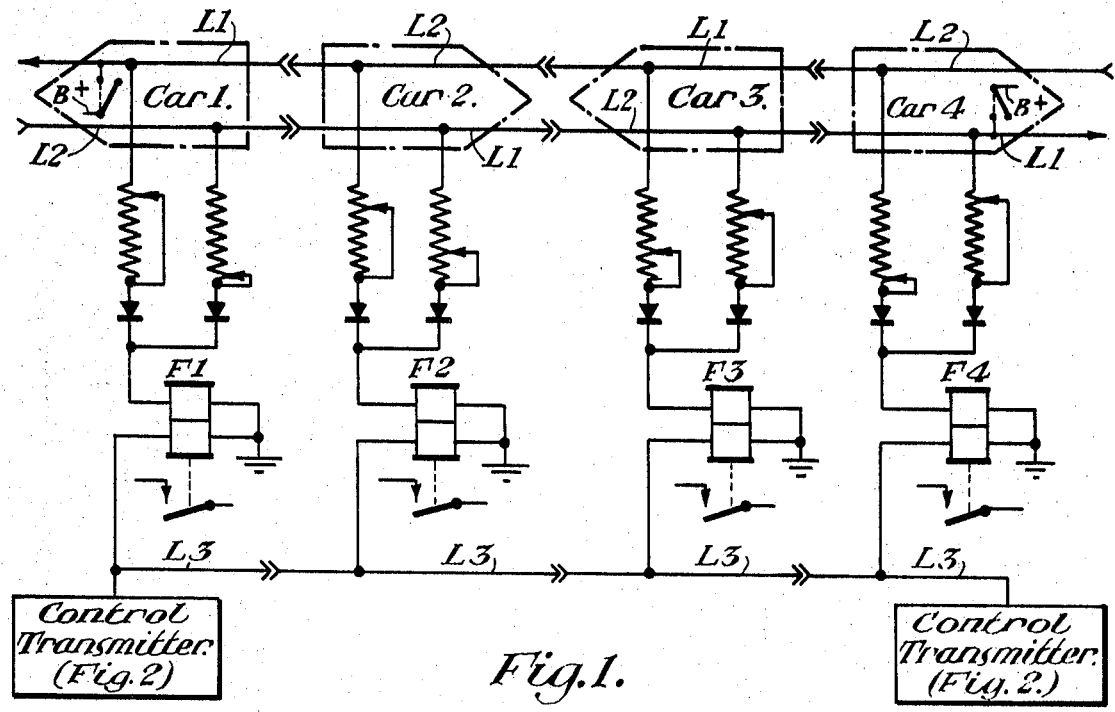
FIG. 1 is a partly conventional, partly diagrammatic illustration of a trainline function control system embodying our invention which is applied to a multiple unit train.

Conventionally, each car of such trains, for example, commuter or rapid-transit-type trains, has a car-carried source of direct current power. Therefore, the specific source herein used is not shown but rather the reference character B+ designates connections to the positive terminal of the leading car direct current source. The conventional ground symbol designates the common ground terminal of the train to which the opposite terminal of each direct current source is connected.

Referring now to FIG. 1, across the top is illustrated, by conventional block diagrams, a four-car train, for example, of the rapid-transit-type. The specific illustration assumes, for illustration only, that the train is made up of married pairs of cars, such as cars 1 and 2 and cars 3 and 4, each of which pair is semipermanently coupled together. The pairs of cars are then coupled into a train which is capable of operating in either direction. Each car of such a train is provided with a trainline cable including a plurality of wires which are automatically connected together into complete trainline circuits from end to end of the train when the cars or pairs of cars are coupled together. Two wires are shown within each car symbol, the directional trainline wires L1 and L2. One of the conventional connecting arrangements between such cars transposes from L1 in one car to L2 in the following cars and back again to L1 for subsequent pairs. This is the connection that has been illustrated in FIG. 1 and the coupling points or connections between the cars are conventionally shown by standard symbols. When the direction of operation of the train is established, the B+ terminal of the source is applied to line L1, in the lead car only, by the closing of the normally open connection through a manually operable switch, shown conventionally in each end car. A third trainline wire L3 for each car, also connected together as indicated by conventional symbols, is shown near the bottom of FIG. 1.

Each car of the train is provided, by the arrangement of our invention, with a differential-type relay to control the preselected controllable function on that car. These relays are illustrated by standard symbols as two winding relays designated by the reference character F with a suffix numeral the same as the car number. Briefly describing the operation of such relays, the flux developed by current flowing in each winding adds together to actuate relay operation. When a predetermined total flux level is reached, the relay picks up to close its front contacts. As specifically illustrated, each relay is provided with only one front contact which when closed actuates the particular function (not shown) on that car which the system is designed to control. As previously indicated, specific examples of such controllable functions are propulsion motors, degree of braking, or some combination of propulsion and braking as used in the more sophisticated concepts of train operation. The lower winding of each relay F is connected between the train line L3 and the common train ground terminal. The purpose and the operation of this particular circuitry will be discussed later. One terminal of the upper winding of each relay F is connected in multiple to train lines L1 and L2 on the corresponding car while the opposite terminal is connected to the common ground terminal. Each connection from the upper winding of a relay includes an adjustable resistor and a diode. The diodes for each relay are so poled as to prevent any flow of current between trainlines L1 and L2 and to eliminate any other possible sneak circuits which might develop. It is to be noted that for relays F1 to F4, in that order, the resistors in the winding connections to the upper trainline on the corresponding car are set for increasing resistance from the front to the rear of the train, that is, from left to right as viewed in the drawing. Said in another way, going from car 1 to car 4, each resistor between the corresponding relay upper winding and the upper trainline is set at a successively higher resistance. The converse is true concerning the resistors in the connections between the relay winding and the lower trainline connections. That is, the increasing resistance is from car 4 to car 1 in that order.

When the train is in use with car 1 as the leading car, the upper windings of relays F1 to F4 in that order receive a decreasing amount of current flow through the winding. The source for this current is over the switch connection completed in the leading car from trainline L1 to the B+ terminal of the car-carried direct current source. The circuit resistances are so adjusted under these conditions that no relay has enough current flowing in the upper winding to create a flux level sufficient to cause the relay to pick up. In other words, each relay, even though receiving energy from trainline L1 or L2 in that car, still requires some energization of, and the resulting flux from, the lower winding in order to pick up to close its front contact. With car 1 leading, as previously described, an increasing amount of current is required in the lower winding of the successive relays F1 to F4, in that order, to provide a sufficient total developed flux to pick up the relay. At the same time, it may also be noted that the circuit parameters are so designed that, without any current in the upper winding, these relays cannot pick up due to current flowing only through the lower winding.

Current flow in the lower winding of these relays is selectively supplied by a control transmitter shown in FIG. 1 by a conventional block connected to trainline L3 in each end car of the train, that is, cars 1 and 4. As will be developed in the following description, only one of these transmitters is active or operating at a time. Actually other transmitters may be provided in cars 2 and 3 so that they may be used as leading cars. However, for simplicity, these additional control transmitters are not here shown and a complete four-car train operation is assumed. The details and operation of the control transmitters will now be described with reference to FIG. 2 in which the detailed transmitter circuits are illustrated.

The basic element of this control transmitter is an asymmetrical, astable or free-running multivibrator element comprising transistors Q5 and Q6 and the associated circuit connections. The operation of multivibrator elements of this general type are sufficiently well known that a detailed description is unnecessary herein and a brief description only for an understanding of the specific operation provided by the present arrangement is included. The timing period for a first condition of the multivibrator, in which transistor Q5 is conducting, is fixed by the resistance, capacitance-timing circuit including resistor R12 and capacitor C2. This specific circuit, of course, extends from the B+ terminal through the cited resistor and capacitor and the collector-emitter path of transistor Q5 to the ground terminal. Since this is a fixed timing circuit, it is obvious that the "off" or nonconducting time period for transistor Q6 is always of the same duration. The timing for the second condition of the multivibrator element, in which transistor Q6 is conducting, is variable. This timing is established by whichever one of the resistors R5 through R8 is connected in series circuit with capacitor C1. The actual resistor used at any time in this circuit is controlled by the switching transistors Q1 through Q4. For example, if transistor Q1 is biased to its conducting condition, resistor R5 is connected in a series circuit with capacitor C1 extending from terminal B+ through resistor R10, the emitter-collector path of transistor Q1, resistor R5, capacitor C1, and the collector-emitter path of transistor Q6 to the ground terminal.

The switching transistors Q1, Q2, Q3, and Q4 are controlled by a control selector switch CSK. This switch or operating lever is mounted adjacent to the conventional controller stand at the operator's control station for the train, located for example in car 1 or car 4 but not specifically shown. Each switch CSK is operable by the train operator to exercise a more selective control of the specific control function apparatus with which it is related which, for example, may be the propulsion and braking controller units on each car. Switch CSK is positioned to its OFF position when that particular control location is not in use, that is, is not in the lead car or train. The four numbered positions designate the type or mode of train operation which results when the switch is so positioned. These numbered positions may also be considered as designating more simply the number of cars in a four-car train, such as in FIG. 1, in which the corresponding controlled apparatus is selectively turned "on" or otherwise actuated. The operation of switch CSK to each numbered position specifically connects the base of the correspondingly numbered transistor Q1 to Q4 to the ground terminal through a resistor R1 to R4, respectively, so that the transistor and, of the four, that transistor only becomes conducting. When any one of these transistors is in its conducting condition, the resistor connected to its collector terminal is obviously connected in series circuit with capacitor C1, as previously described, to provide a particular selected timing period for the second condition of the multivibrator element. By a proper selection of the values of the resistors R5 to R8 in the design of the system, a progressive sequence of operating times, i.e., nonconducting times, for transistor Q5 may be obtained as switch CSK is moved to select the various operating modes 1 to 4, respectively. As it will become apparent, in the present system resistor R5 must provide the longest operating, i.e., nonconducting time for transistor Q5 and resistor R8 the shortest time.

The output of the multivibrator element, from the collector terminal of transistor Q6, is applied to the base of transistor Q7 which is connected in an emitter-follower arrangement. The output of this latter circuit arrangement, at the emitter terminal of transistor Q7, is supplied as the transmitted signal to trainline L3. This trainline or circuit path L3 is a single communication channel, as illustrated in FIG. 1, with the circuit completed through the ground terminals. Transistor Q7 is obviously conducting when transistor Q6 is in its nonconducting condition and the output supplied to line L3 is thus a B+ potential pulse when transistor Q6 is turned off. Therefore, the positive pulses in the transmitted signal on trainline L3 are of equal duration. Conversely, the OFF or ground potential pulses vary in time duration in accordance with the operating or nonconducting time established for transistor Q5. Thus, the positive pulses on line L3 have a duty cycle characteristic, that is, a percent "on-time", in accordance with the position of selector switch CSK. It is to be noted that the duty cycle rather than the frequency of the B+ pulses is the important characteristic of the transmitted signal. In other words, the total time the positive or ON pulse is present within a preset time period, for example, a complete cycle of operation, including a B+ or "on-time" pulse and the subsequent "off-time" or ground potential pulse, is the significant signal characteristic.

Figure 2:
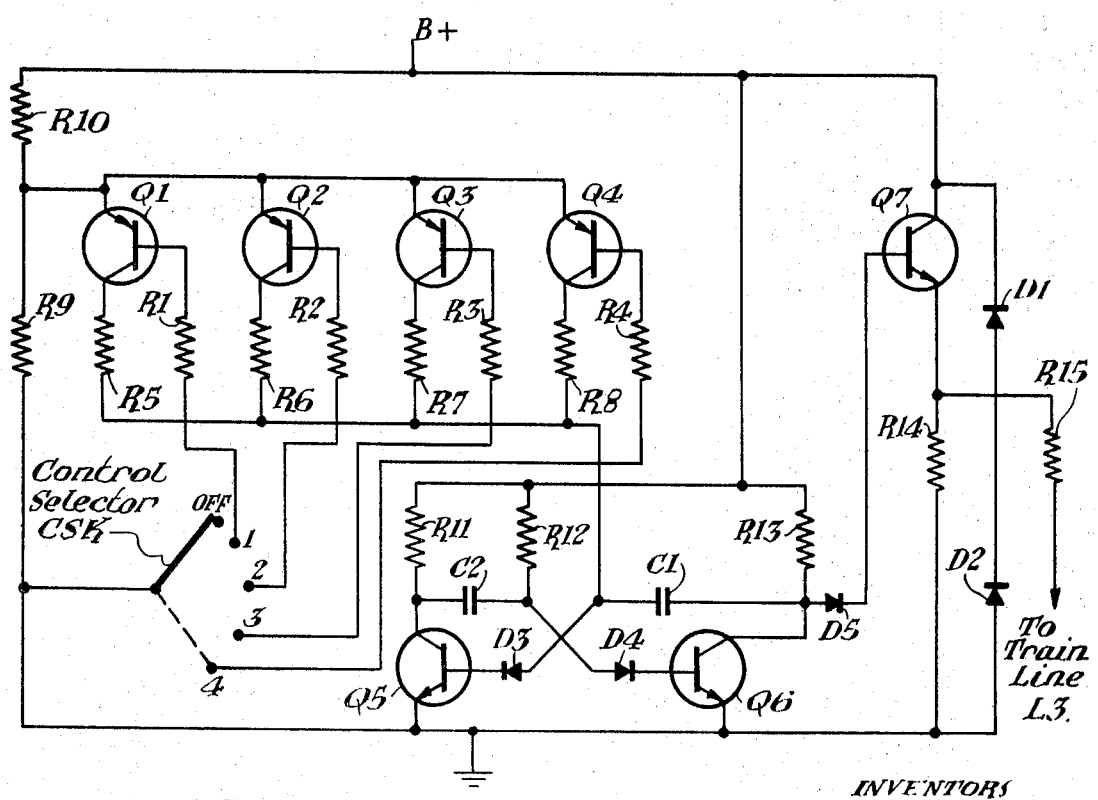
FIG. 2 is a circuit diagram of a control transmitter usable in the trainline control system shown in FIG. 1.

We shall now consider the operation of the system embodying our invention to provide a selective control of the controllable train function, for example, the train-propulsion controls. It is assumed that the train in FIG. 1 is to be operated with car 1 in the lead. As a specific example, it is further assumed that resistors R5 to R8, in the control transmitter illustrated in FIG. 2, are so selected that the percent duty cycle or on-time characteristic of the B+ pulses transmitted over trainline L3, when one of these resistors is selectively in the timing circuit, 20, 40, 60, and 80 percent, respectively. When the train operator selects the direction of operation, B+ is connected to line L1 in car 1 but not in car 4. Thus the positive potential from terminal B+ appears on the upper trainline but there is no potential on the lower trainline extending throughout the train, as shown in FIG. 1. Current thus flows through the upper winding of each relay F in accordance with the setting of the resistor connected on each particular car between the upper winding of the corresponding relay and the upper trainline. As previously described, sufficient flux is not developed in any one of the relays, as a result of this current flowing in its upper winding through the connection to the directional trainline, to cause a relay to pick up. It is to be remembered further that the level of energization of the windings and thus the developed flux successively decreases from the lead car to the last car.

Assuming that the F relays control at least a propulsion function of train operation, the operator now advances switch CSK in the lead car to its position 1. This completes the connection from the base terminal of transistor Q1 through resistor R1 to ground. Transistor Q1 thus becomes conducting and connects resistor R5 in the timing circuit with capacitor C1 to initiate operation of the multivibrator element. As previously indicated, resistor R5 is of such preselected value that the multivibrator operation at this time provides a 20 percent duty cycle characteristic for the B+ pulses transmitted from the emitter terminal of transistor Q7 to trainline L3.

The transmitted signals with the assumed duty cycle characteristic flow through trainline L3 and thus through the lower winding of relay F on each car. Each relay winding acts as an averaging means or device and causes the flow of a steady direct current through the relay winding having an average or effective value in accordance with the selected percent duty cycle or "on-time" of the positive energy pulses. Thus, a low level flux is now created by the current flowing through each lower winding since the "on-time" characteristic is 20 percent. The design parameters are such that the total flux developed in both windings is sufficient only in relay F1 to cause it to pick up to close its front contact. The closing of the front contact of relay F1 actuates the propulsion control function on the lead car.

If the operator desires a different mode of operation, he advances switch CSK to a higher numbered position. Assuming that he desires full operation, switch CSK is moved to position 4 so that the multivibrator operation produces an 80 percent duty cycle characteristic in the transmitted signals. Such signals in line L3 provide an average or effective current flow through each of the relays that the developed flux is sufficient, even in relay F4 which has the lowest current flow in its upper winding, to cause all relays to pick up. With all the relays picked up, the propulsion control function is actuated on each car and the mode of operation in which each car supplies a portion of the propulsion effort is obtained. The selection of intermediate positions 2 and 3 on switch CSK give intermediate propulsion conditions or operating modes in accordance with the relays operated. Specifically, when switch CSK is in position 2, relays F1 and F2 on the train are operated while the positioning of switch CSK in its No. 3 position adds relay F3 to those already actuated and changes the mode of operation accordingly.

Thus, it is apparent that the sequential operation of switch CSK from its OFF position through the four numbered positions successively actuates the propulsion function on the successive cars of the train, each switch position adding an additional car to those previously actuated. This results from the sequential pickup of relays F1, F2, F3, and F4 in successive order as the switch CSK traverses its four positions. It is also obvious that, when car 4 is the lead car of the train as it moves in the opposite direction, the corresponding operation of switch CSK associated with the control transmitter on that car will successively actuate or cause to operate relays F4, F3, F2, and F1 in that order. This results since the steady energy will appear in the lower directional trainline shown in the car symols, the B+ terminal being connected to trainline L1 in car 4 under this situation.

The arrangement of our invention thus provides a relatively simple yet effective means for individually controlling the functions on the separate cars of a train, while requiring a minimum number of trainline wires or channels for communication purposes between the control location and the individual cars. The differential relays, although relatively inexpensive items, have long operating lives and thus will provide satisfactory service in such arrangements in an economical manner. The resulting system provides also a more accurate control of train functions, for example, propulsion control. This results in a smoother ride and more efficient operation of the train.

Although we have herein shown and described but one form of a system embodying our invention, it is to be understood that changes and modifications within the scope of the appended claims may be made in the illustrated arrangements without departing from the spirit and scope of our invention.

Having thus described our invention, what we claim is:

1. A trainline control system for transmitting a particular control function over trainline channels from the operating location of a train selectively to each of a plurality of cars in that train, comprising in combination,
   a. first and second trainline communication channels,
   b. a differential relay on each car of said train, each relay responsive only to the same predetermined total effective energizing current for actuating said particular function on the corresponding car,
   c. a variable impedance circuit for connecting said relay to said first channel with the impedances successively increasing in a preselected pattern of said cars,
   d. contactor means at said operating location for connecting a fixed energy source to said first channel when said train is operating, and
   e. transmitter means at said operating location with connections for supplying a selected one of a plurality of characteristic energy signals to said second channel,
   f. each relay having other connections to said second channel and responsive jointly to the effective value of current received from said selected characteristic signal and to the current received from said first channel for actuating said particular function on the corresponding car only when the total energizing current received exceeds said predetermined total.

2. A control system as defined in claim 1 in which,
   a. each energy signal supplied by said transmitter means is a series of pulses having a selected duty cycle characteristic, and
   b. each relay averages the received pulses for establishing the effective value of that received current in accordance with the selected duty cycle characteristic to determine its response to the total current received.

3. A control system as defined in claim 2 in which said transmitter means includes,
   a. a multivibrator element for forming said energy signal pulses and having connections for transmitting said pulses over said second channel,
   b. a selector switch operable for selecting one of a plurality of operating modes for said train,
   c. a timing circuit network for said multivibrator element controlled by said selector switch for varying the duty cycle characteristic of said signal pulses in accordance with the selected train-operating mode.

4. A control system as defined in claim 3 in which said contactor means is a normally open switch contact manually operable to a closed circuit condition only when said train is to move with the corresponding operating location at the leading end of said train.

5. A control system as defined in claim 4 in which the circuit parameters of said variable impedance circuits and said timing circuit network are designed for supplying said predetermined total effective energizing current to a relay only when both currents are present at least at some selected level.

6. A control system as defined in claim 5 in which the predetermined pattern by which the impedance increases is the successive cars from the lead car to the last car of said train.

7. A control system as defined in claim 6 in which said parameters of said variable impedance circuits and said timing circuit network are further designed for activating response by said relays in succession from front to rear of said train as the duty cycle characteristic of said signal pulses is increased.

8. Apparatus for transmitting a particular control function from an operating station of a train to a car of that train, comprising in combination,
   a. a first and a second trainline communication channel between said operating station and said car,
   b. a source of energy having a fixed level and connected to said first channel at said operating station,
   c. a differential relay on said car responsive to a predetermined level of energization for actuating said particular control function,
   d. a circuit having a selected impedance for connecting said relay to said first channel to receive an energy signal reduced a preselected amount below said predetermined level, and
   e. a transmitter means having connections to said second channel for transmitting another signal having a selected energy characteristic,
   f. said relay having connections to said second channel and responsive to said other signal for actuating said control function only when the effective energization level from said selected energy characteristic jointly with the energization level from said reduced energy signal exceeds said predetermined energization level.

9. Apparatus as defined in claim 8 in which said other signal transmitted by said transmitter means is a series of energy pulses having a selected duty cycle characteristic and whose effective energy level is the average energy transmitted in accordance with the duty cycle characteristic.

10. Apparatus as defined in claim 9 further including,
   a. a differential relay on each car of a multiunit train, each relay connected to said second channel,
   b. a separate impedance circuit for connecting each relay to said first channel to receive a reduced energy level signal, each impedance selected to provide a successively reduced energy amount different for each relay,
   c. a selector means at said operating station having connections for controlling said transmitter means to transmit pulses having a selected one of a plurality of successive duty cycle characteristics,
   d. each successive series of pulses of different duty cycle characteristics having an effective energy level to actuate the control function on an additional car.

* * * * *